United States Patent [19]

Webb et al.

[11] Patent Number: 5,520,745
[45] Date of Patent: May 28, 1996

[54] REMEDIATION OF CONTAMINATED MATERIAL

[75] Inventors: Jimmy L. Webb, Ballston Lake; Herman O. Krabbenhoft, Scotia; David G. Gascoyne, Schenectady, all of N.Y.

[73] Assignee: General Electric Company, Schenectady, N.Y.

[21] Appl. No.: 300,899

[22] Filed: Sep. 6, 1994

[51] Int. Cl.$^6$ .................................................. B08B 7/04
[52] U.S. Cl. ........................... 134/12; 134/25.1; 134/29; 134/30
[58] Field of Search ................... 134/25.1, 29, 30, 134/42, 12

[56] References Cited

U.S. PATENT DOCUMENTS

| | | | |
|---|---|---|---|
| 4,424,081 | 1/1984 | Giguere | 134/10 |
| 4,783,263 | 11/1988 | Trost et al. | 210/683 |
| 4,902,441 | 2/1990 | Pellenbarg et al. | 252/187.26 |
| 4,906,302 | 3/1990 | Bruya | 134/10 |
| 5,039,350 | 8/1991 | Rogers et al. | 134/27 |
| 5,055,196 | 10/1991 | Darian et al. | 210/638 |
| 5,064,526 | 11/1991 | Rogers et al. | 208/262.5 |
| 5,256,208 | 10/1993 | Rafson | 134/25.1 |
| 5,305,886 | 4/1994 | Kehl et al. | 209/2 |

OTHER PUBLICATIONS

Abstract—T. Suzuki et al., Development of Low Melting Point Molten Salts. Thermal Decomposition of Molten Ammonium Formate, Inorganic Chem. vol. 83, 1975, p. 423 no month available.

Article—L. Erdey et al., Thermoanalytical Properties of Analytical–Grade Reagents Ammonium Salts, Talanta Jan. 1964, vol. 11, pp. 913–940.

Article—J. E. House, Jr., A TG Study of the Kinetics of Decomposition of Ammonium Carbonate and Ammonium Bicarbonate, Thermochimica Acta, 40 (1980), pp. 225–233 no month available.

Article—J. E. House, Jr., and D. D. Dunlap, TG Studies on the Decomposition of Some Ammonium Compounds, Thermochimics Acta. 42 Jun. 1980, pp. 377–381.

Abstract—A. Baranski, Rate of Decomposition of Ammonium Carbamate, Chem. Stosowana7, (1963), 2 pages no month available.

Primary Examiner—David L. Lacey
Assistant Examiner—Sean Vincent
Attorney, Agent, or Firm—Noreen C. Johnson; James Magee, Jr.

[57] ABSTRACT

A method for the removal of halogenated organic contaminants from particulate material by admixing an additive selected from the group consisting of a sodium salt and an ammonium salt with the particulate material, and passing a vapor phase of steam through the material to substantially remove the halogenated organic contaminant.

16 Claims, No Drawings

REMEDIATION OF CONTAMINATED MATERIAL

CROSS-REFERENCE TO RELATED APPLICATION

This application is related to the following copending and commonly assigned application, entitled "Method to Remove Halogenated Hydrocarbons from Particlate Matter," J. L. Webb et al., U.S. application Ser. No. 08/300,900, filed concurrently herewith.

FIELD OF THE INVENTION

This invention is directed to the remediation of particulate material contaminated with halogenated organic compounds. Particularly, the invention relates to the removal of chlorinated organic compounds from materials by mixing a sodium salt or an ammonium salt with the contaminated material and then thermally sweeping said material with a vapor stream.

BACKGROUND OF THE INVENTION

Compounds such as polychlorinated biphenyls (PCBs), dichloro-diphenyl trichloroethane (DDT), trichloroethylene (TCE), and chlorinated benzenes have been found to be persistent compounds in the environment. Due to spills and prior usage, these compounds are often found in soil, sludge and building materials. Their disposal requires a safe and efficient means.

Various methods for the removal or destruction of halogenated organic compounds are known. For example, the Peterson U.S. Pat. No. 4,574,013 discloses a process wherein a heated slurry of contaminated soil is treated with a mixture of an alkaline constituent and a sulfoxide catalyst. This process is disadvantageous in that the sulfoxide catalyst may transport contaminants into living systems, the sulfoxide catalyst produces odorous compounds when heated to high temperatures and decomposes into combustible by-products, and the process requires large amounts of reagents.

Additionally, polychlorinated biphenyls in contaminated soils have been reduced by the use of incineration and surfactant-assisted washing. These methods are quite costly or require complex operations. For example, surfactant-assisted soil-washing requires many unit operations in order to remove the polychlorinated biphenyls from the soil and to regenerate the surfactant wash solution.

Copending and commonly assigned patent application, entitled "Process for Remediation of a Contaminated Particulate Material," filed May 16, 1994, Ser. No. 08/242,768, discloses a method that removes halogenated organic contaminants from particulated material by utilizing a thermal desorption sweep with a vapor stream containing water and an amine or amide organic additive. The contaminated material is cleaned using the process at ambient pressure and a temperature between about 250°–340° C.

A need exists for a method to remediate contaminated materials which is relatively inexpensive and obtains acceptable removal levels of halogenated organic contaminants from particulate material at temperatures between about 300°–400° C. There is also a need for a method that can utilize sodium salts and ammonium salts to substantially remove halogenated organic contaminants from particulate material.

SUMMARY OF THE INVENTION

This invention fulfills these needs by providing a method for the removal of halogenated organic compounds dispersed within contaminated particulate material where a sodium salt or an ammonium salt is mixed with the contaminated material, and a cleaning vapor phase, consisting essentially of water, is swept through the material at a temperature between about 300°–400° C., for a time sufficient to substantially remove all of the halogenated compounds from the particulate material.

Sodium salts that are added to the contaminated material include, but are not limited to, sodium formate, sodium acetate, sodium oxalate, sodium carbonate, sodium bicarbonate, sodium carbamate, and the like. Examples of ammonium salts include, but are not limited to, ammonium formate, ammonium acetate, ammonium oxalate, ammonium carbonate, ammonium bicarbonate, and the like, and N-alkylated ammonium salts, N,N-dialkylated ammonium salts, and N,N,N-trialkylated ammonium salts, such as N-ethylammonium formate, N,N-diethylammonium formate, and N,N,N-triethylammonium formate, respectively.

In this invention the term "substantially remove" means that ten parts per million or less of the halogenated organic contaminant remain in the particulate material after completion of this method. Using the method of this invention, a sufficient amount of time to do this is about ten to about thirty minutes.

Additionally, it has been discovered that ammonia is effective when combined with steam for the removal of halogenated organic contaminants from particulate material. Thus, the invention also encompasses a method for the removal of halogenated organic compounds dispersed within contaminated particulate material where the material is contacted with a vapor phase containing water and ammonia at a temperature about 300° to about 400° C., for a sufficient amount of time to substantially remove the halogenated organic compounds from the particulate material, so that ten parts per million or less of said compound remain.

An object of this invention is to provide a simple and cost-effective process that would remediate polychlorinated biphenyl containing soils so that the residual polychlorinated biphenyl level would be less than or equal to ten parts per million, preferably less than or equal to five parts per million, and even more preferably, less than or equal to two parts per million.

It is also an object of this invention to provide a method wherein environmentally acceptable levels of halogenated organic compounds are achieved in treated materials within a short period of time.

DESCRIPTION OF THE INVENTION

A method is taught for the remediation of particulate material contaminated with halogenated organic compounds which comprises the steps of admixing the particulate material with an effective amount of an additive selected from the group consisting essentially of sodium salts and ammonium salts; and contacting the admixture of particulate material and additive with a vapor phase selected from the group consisting essentially of water at a temperature between about 300°–400° C., for a time sufficient to remove substantially all of the halogenated organic compounds from the particulate material whereby a residual amount less than or equal to ten parts per million of the halogenated organic compound remains in the particulate material.

The term "effective amount of an additive" herein means about one to fifteen weight percent of the additive mixed with the contaminated particulate material. About two to five weight percent of the additive is the preferred amount.

The term "halogenated organic compounds" as contaminants includes aliphatic compounds, such as trichloroethane, trichloroethylene, perchloroethylene, and the like; and aromatic compounds, such as polychlorinated biphenyls, dioxins, chlorobenzene, pentachlorophenols, and the like. Brominated organic compounds that are found to be hazardous also can be removed by the claimed process.

This process is conducted at temperatures suitable with hot oil heating systems. Such process temperatures range from about 300°–400° C. A preferred temperature range is about 330°–370° C., and a most preferred temperature range is about 345°–355° C.

Contaminated particulate materials are generally porous and may comprise, but are not limited to, soil, sand, sludge, sediment, gravel, pulverized concrete, and the like. The present method is particularly adapted for use with soil.

Various sodium and ammonium salts are suitable for use as additives in this invention. Of these, certain compounds significantly enhance the process of stripping halogenated organic contaminants from particulate material at temperatures between about 300°–400° C. In particular, sodium formate ($NaO_2CH$), sodium acetate ($NaO_2CCH_3$), ammonium formate ($NH_4O_2CH$), and ammonium acetate ($NH_4O_2CCH_3$) are especially effective.

Table 1 demonstrates the superior results obtained for experiments conducted with sodium formate and sodium acetate at about 300° to 350° C. for fifteen minutes with soil having an initial polychlorinated biphenyl (PCB) level of about 700 parts per million (ppm).

By adding about five percent by weight or less of either sodium formate or sodium acetate to the soil and then passing water vapor through the soil for about fifteen minutes, the polychlorinated biphenyls in the soil are reduced to less than two parts per million.

TABLE 1.

Reduction of Polychlorinated Biphenyls in Soil by Steam Stripping Assisted by the Addition of Sodium Formate or Sodium Acetate to the Soil.

TABLE 1

Reduction of Polychlorinated Biphenyls in Soil by Steam Stripping Assisted by the Addition of Sodium Formate or Sodium Acetate to the Soil.

| Sample | Additive (wt. %) | Flow g/min | Temp. °C. | Residual PCBs ppm | % PCB Removed. |
|---|---|---|---|---|---|
| 1 | none | 0.1 | 349 | 12.6 | 98.1 |
| 2 | $NaHSO_4$ (5) | 0.1 | 350 | 11.9 | 98.3 |
| 3 | $Na_2CO_3$ (5) | 0.1 | 348 | 10.2 | 98.6 |
| 4 | $Na_2(CO_2)_2$ (5) | 0.1 | 349 | 10.3 | 98.5 |
| 5 | $NaO_2CCH_3$ (5) | 0.1 | 344 | 2.5 | 99.6 |
| 6 | $NaO_2CH$ (5) | 0.1 | 347 | 0.9 | 99.9 |
| 7 | $NaO_2CH$ (2.5) | 0.1 | 348 | 1.7 | 99.8 |
| 8 | $NaO_2CH$ (1.25) | 0.1 | 346 | 2.9 | 99.6 |
| The following samples were tested at about 300° C. | | | | | |
| 9 | none | 0.1 | 304 | 36.4 | 94.8 |
| 10 | $Na_2CO_3$ (5) | 0.1 | 298 | 39.2 | 94.4 |
| 11 | $NaHSO_4$ (5) | 0.1 | 301 | 45.1 | 93.6 |
| 12 | $NaO_2CH$ (5) | 0.1 | 304 | 13.1 | 98.1 |

As shown above, the addition of either sodium carbonate ($Na_2CO_3$) (5% by weight) or sodium bisulfite ($NaHSO_4$) (5% by weight) provides no advantage compared to the use of plain water vapor (steam) at about 300°–350° C. The polychlorinated biphenyl level in the contaminated soil is reduced to about 10–13 parts per million at 350° C. in each instance, and similarly at 300° C., the polychlorinated biphenyl level in the soil is reduced to about 36–45 parts per million.

Surprisingly, the addition to the soil of sodium formate (5% by weight) or sodium acetate (5% by weight) significantly lowers residual polychlorinated biphenyl levels to about 0.9–1.2 parts per million and 2.5 parts per million, respectively, when the process is used at 350° C. It is further noted that at 300° C., the addition of sodium formate (5% by weight) to the soil results in a substantial reduction in the polychlorinated biphenyl level compared to the use of steam alone or in conjunction with sodium carbonate or sodium bisulfite.

Another aspect of this invention is the passage of steam between about 300°–400° C. at atmospheric pressure for about fifteen minutes through a column of contaminated particulate material to which has been added by dry-mixing a small amount, about 5% by weight, of an ammonium salt. The residual halogenated organic contaminant in the particulate material is reduced to a level less than or equal to about ten parts per million, and preferably less than or equal to about five parts per million.

An advantage of using ammonium salts in the claimed invention is the decomposition of ammonium to gaseous products. The ammonium salts are thermally decomposed quantitatively to gaseous products, which are swept away with the steam. There is no residue from the additive left on the soil.

Table 2 presents results for experiments conducted for fifteen minutes at about 350° C. with a soil containing about 700 parts per million polychlorinated biphenyl.

TABLE 2.

Reduction of Polychlorinated Biphenyls in Soil by Steam Stripping Assisted by the Addition of Ammonium Formate ($NH_4O_2CH$) or Ammonium Acetate ($NH_4O_2CCH_3$) to the Soil.

TABLE 2

Reduction of Polychlorinated Biphenyls in Soil by Steam Stripping Assisted by the Addition of Ammonium Formate ($NH_4O_2CH$) or Ammonium Acetate ($NH_4O_2CCH_3$) to the Soil.

| Sample | Additive (5 wt. %) | Flow g/min | Temp. °C. | Residual PCBs ppm | % PCB Removed. |
|---|---|---|---|---|---|
| 1 | none | 0.1 | 349 | 12.6 | 98.1 |
| 2 | $NaO_2CH$ | 0.1 | 347 | 0.9 | 99.9 |
| 3 | $NH_4O_2CH$ | 0.1 | 347 | 1.0 | 99.9 |
| 4 | $NaO_2CCH_3$ | 0.1 | 344 | 2.5 | 99.6 |
| 5 | $NH_4O_2CCH_3$ | 0.1 | 343 | 2.6 | 99.6 |
| 6 | $Na_2(CO_2)_2$ | 0.1 | 349 | 10.3 | 98.5 |
| 7 | $(NH_4)_2(CO_2)_2$ | 0.1 | 341 | 9.7 | 98.6 |
| 8 | $Na_2CO_3$ | 0.1 | 348 | 10.2 | 98.6 |
| 9 | $(NH_4)_2CO_3$ | 0.1 | 348 | 5.6 | 99.2 |
| 10 | $NaHCO_3$ | 0.1 | 345 | 4.6 | 99.3 |
| 11 | $NH_4HCO_3$ | 0.1 | 350 | 5.5 | 99.2 |

The above data show that the addition of sodium formate (5% by weight) or ammonium formate (5% by weight) provides treated soil with about one part per million residual polychlorinated biphenyl. Similarly, the addition of either sodium acetate (5% by weight) or ammonium acetate (5% by weight) affords processed soil with about 2.5 parts per million residual polychlorinated biphenyls. Analogous results are obtained for sodium carbonate ($Na_2CO_3$), sodium bicarbonate ($NaHCO_3$), ammonium carbonate ($(NH_4)_2CO_3$), and ammonium bicarbonate ($NH_4HCO_3$), although the residual polychlorinated biphenyl levels are a little higher, generally about five parts per million. Ammonium salt additives provide processed soil with a significantly lower residual polychlorinated biphenyl level than the use of water vapor alone.

Table 3 provides data indicating that ammonia is also an effective additive for achieving enhanced reduction of halogenated organic contaminants in particulate material. It is noted that the use of water vapor alone at about 350° C. for fifteen minutes results in a residual polychlorinated biphenyl concentration of about 12.6 parts per million. Ammonia fed into the vapor stream in varying amounts provides for significantly increased removal of the contaminant to as little as 1.7 parts per million residual polychlorinated biphenyl.

TABLE 3

Effect of Ammonia as an Additive for
Removal of Polychlorinated Biphenyls from
Soil with Steam.

| Sample | Wt % $NH_3$ in Feed | Flow ml/min | Temp. °C. | Wt % $NH_3$ to Soil | Residual PCBs ppm |
|---|---|---|---|---|---|
| 1 | none | 0.1 | 349 | none | 12.6 |
| 2 | 5 | 0.1 | 311 | 0.25 | 27.9 |
| 3 | 5 | 0.1 | 349 | 0.25 | 7.3 |
| 4 | 29.7 | 0.29 | 353 | 2.5 | 4.3 |
| 5 | 29.7 | 0.57 | 352 | 5.0 | 4.1 |
| 6 | 29.7 | 0.57 | 354 | 10.0 | 1.7 |

The process of this invention can be carried out by methods known in the art. Example 1 demonstrates one manner of performing this invention.

EXAMPLE 1

In a typical experiment, a stainless steel cell, such as a one-inch diameter tube equipped with Swagelok fittings at each end, was filled with a mixture of polychlorinated biphenyl-contaminated soil and the selected additive. After connecting inlet and exit lines, 1/16 inch tubing, the cell is immersed in a molten salt bath while simultaneously initiating the flow of water by means of high pressure liquid pump. The coiled inlet tube is of sufficient length so as to permit the water to become completely vaporized and reach the temperature of the molten salt bath before entering the cell and contacting the soil. The effluent from the cell is passed through a condenser so that the water, polychlorinated biphenyls, and any other volatiles from the soil are condensed. After a period of time, the flow of water is stopped and the cell removed from the molten salt bath; the soil is then removed from the cell and analyzed for residual polychlorinated biphenyl content. Tables 1–3 collect the relevant data for Example 1.

What is claimed:

1. A method to remediate particulate material contaminated with halogenated organic compounds, comprising the steps of:

admixing the particulate material with an effective amount of an additive to remove the halogenated organic compounds from the particulate material in an effluent, where the additive is selected from the group consisting of sodium salts and ammonium salts;

heating the particulate material and the additive to a process temperature between about 300°–400° C.; and contacting the particulate material and the additive with a vapor phase consisting essentially of water at the process temperature, for a time sufficient to remove substantially all of the halogenated organic compounds from the particulate material in the effluent, whereby a residual amount less than about 10 parts per million of the halogenated organic compound remains in the particulate material and where the effluent is passed through a condenser so that water, the halogenated organic compounds, and volatiles from the particulate material are condensed.

2. A process according to claim 1 where the sodium salt is selected from the group consisting of sodium formate, sodium acetate, sodium oxalate, sodium carbonate, sodium bicarbonate, sodium carbamate, and the ammonium salt is selected from the group consisting of ammonium formate, ammonium acetate, ammonium oxalate, ammonium carbonate, ammonium bicarbonate, a N-alkylated ammonium salt, a N,N-dialkylate ammonium salt, and a N,N,N-trialkylated ammonium salt.

3. A method according to claim 1 where the effective amount of additive is about 1–15 weight percent.

4. A method according to claim 3 where the effective amount of additive is about 2–5 weight percent.

5. A method according to claim 1 where the particulate material is selected from the group consisting of soil, gravel, sludge, sediment, sand, concrete, and mixtures thereof.

6. A method according to claim 1 where the halogenated organic compound is selected from the group consisting of chlorinated organic compounds and brominated organic compounds.

7. A method according to claim 6 where the chlorinated organic compounds are selected from the group consisting of chlorinated biphenyls, polychlorinated biphenyls, dichloro-diphenyl trichloroethane, trichloroethylene, perchloroethylene, dioxins, chlorobenzene, and pentachlorophenols.

8. A method according to claim 1 where the process temperature is about 330°–370° C.

9. A method according to claim 8 where the process temperature is about 345°–355° C.

10. A method according to claim 1 where the time to substantially remove the halogenated organic compound is about 10–30 minutes.

11. A process for removal and condensation of polychlorinated biphenyls from soil which comprises admixing with the soil an additive selected from the group consisting of a sodium salt and an ammonium salt in an effective amount to remove about 98 percent of the polychlorinated biphenyls from the soil in an effluent;

heating the soil and the additive to a process temperature between about 300°–400° C.; and sweeping the soil and said additive with a vapor phase consisting of water at the process temperature for about 10–30 minutes, and where the effluent is passed through a condenser so that water, the polychlorinated biphenyls and volatiles from the soil are condensed.

12. A process according to claim 11 where the sodium salt additive is selected from the group consisting of sodium formate, sodium acetate, sodium oxalate, sodium carbonate, sodium bicarbonate, sodium carbamate, and the ammonium salt additive is selected from the group consisting of ammonium formate, ammonium acetate, ammonium oxalate, ammonium carbonate, ammonium bicarbonate, a N-alkylated ammonium salt, a N,N-dialkylated ammonium salt, and a N, N, N-trialkylated ammonium salt.

13. A process according to claim 11 where the effective amount of additive is about 1–15 weight percent.

14. A process according to claim 13 where the effective amount of additive is about 2–5 weight percent.

15. A process according to claim 11 where the process temperature is about 330°–370° C.

16. A process according to claim 15 where the process temperature is about 345°–355° C.

* * * * *